United States Patent [19]

Loutaty et al.

[11] 4,306,829
[45] Dec. 22, 1981

[54] APPARATUS AND METHOD FOR DISTRIBUTION OF A DIVIDED SOLID IN AN ENCLOSURE

[75] Inventors: Roben Loutaty, Le Havre; Yvon Haquet, St. Romain De Colbosc, both of France

[73] Assignee: Compagnie Francaise de Raffinage, Paris, France

[21] Appl. No.: 58,210

[22] Filed: Jul. 17, 1979

[30] Foreign Application Priority Data

Jul. 20, 1978 [FR] France ................................. 78 21485

[51] Int. Cl.³ ............................................. B65G 65/32
[52] U.S. Cl. ................................... 414/301; 239/687; 414/786
[58] Field of Search ............... 414/205, 206, 293, 300, 414/301; 198/642; 239/687; 406/162

[56] References Cited

U.S. PATENT DOCUMENTS

| 1,021,757 | 4/1912 | Blaisdell | 414/300 |
| 2,862,717 | 12/1958 | Ronning | 198/642 |
| 4,159,151 | 6/1979 | Wood | 406/162 |

*Primary Examiner*—Robert G. Sheridan
*Attorney, Agent, or Firm*—Curtis, Morris & Safford

[57] ABSTRACT

Apparatus for distribution of particulate matter in a tank or similar enclosure, comprising a feed hopper, a discharge conduit integral with the hopper, a motor-driven rotating shaft disposed axially of the outlet opening of the conduit, and downstream of said outlet opening is at least one fairly soft deflecting means carried on the shaft and articulated thereto so as to diverge angularly by the effect of the centrifugal force when driven in rotation. The apparatus is for use particularly in charging a chemical reactor with catalyst particles and in the storage of grains in silos.

19 Claims, 6 Drawing Figures

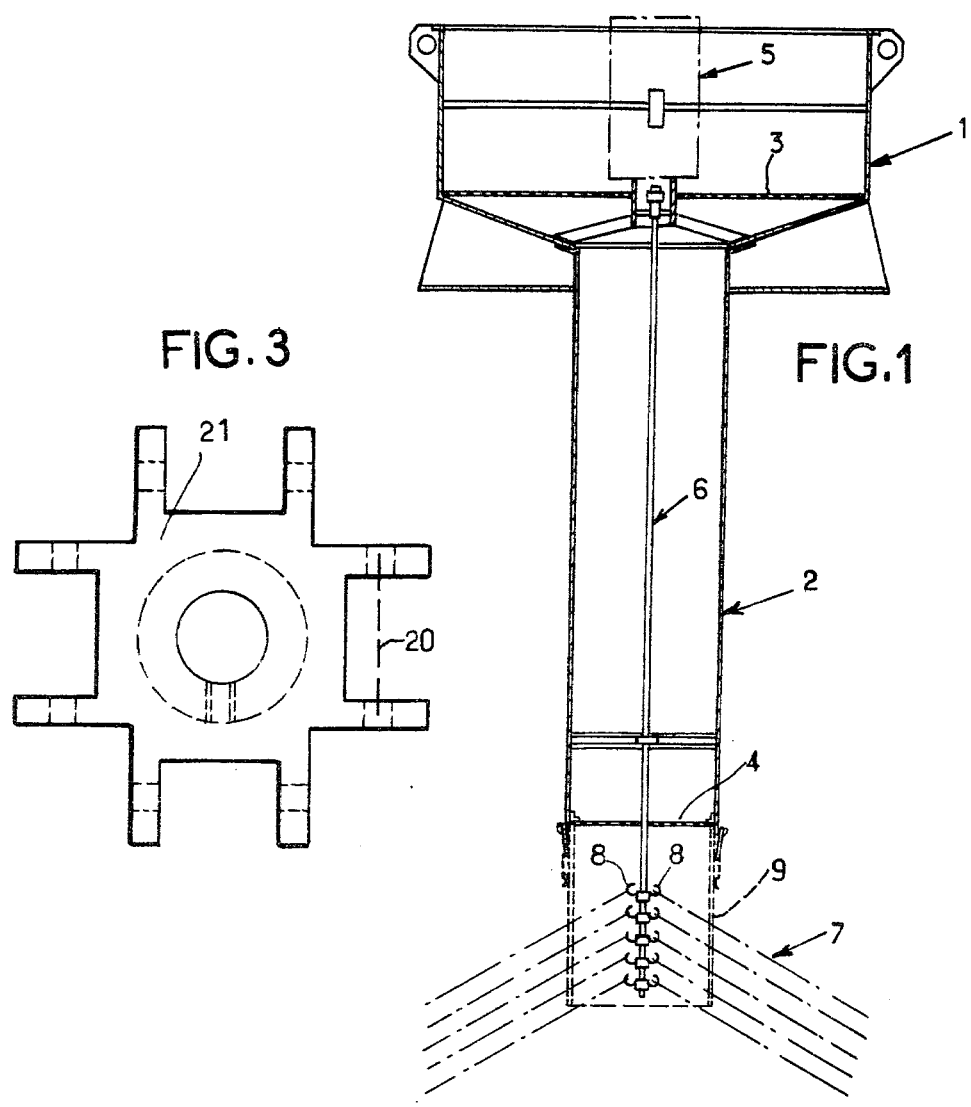

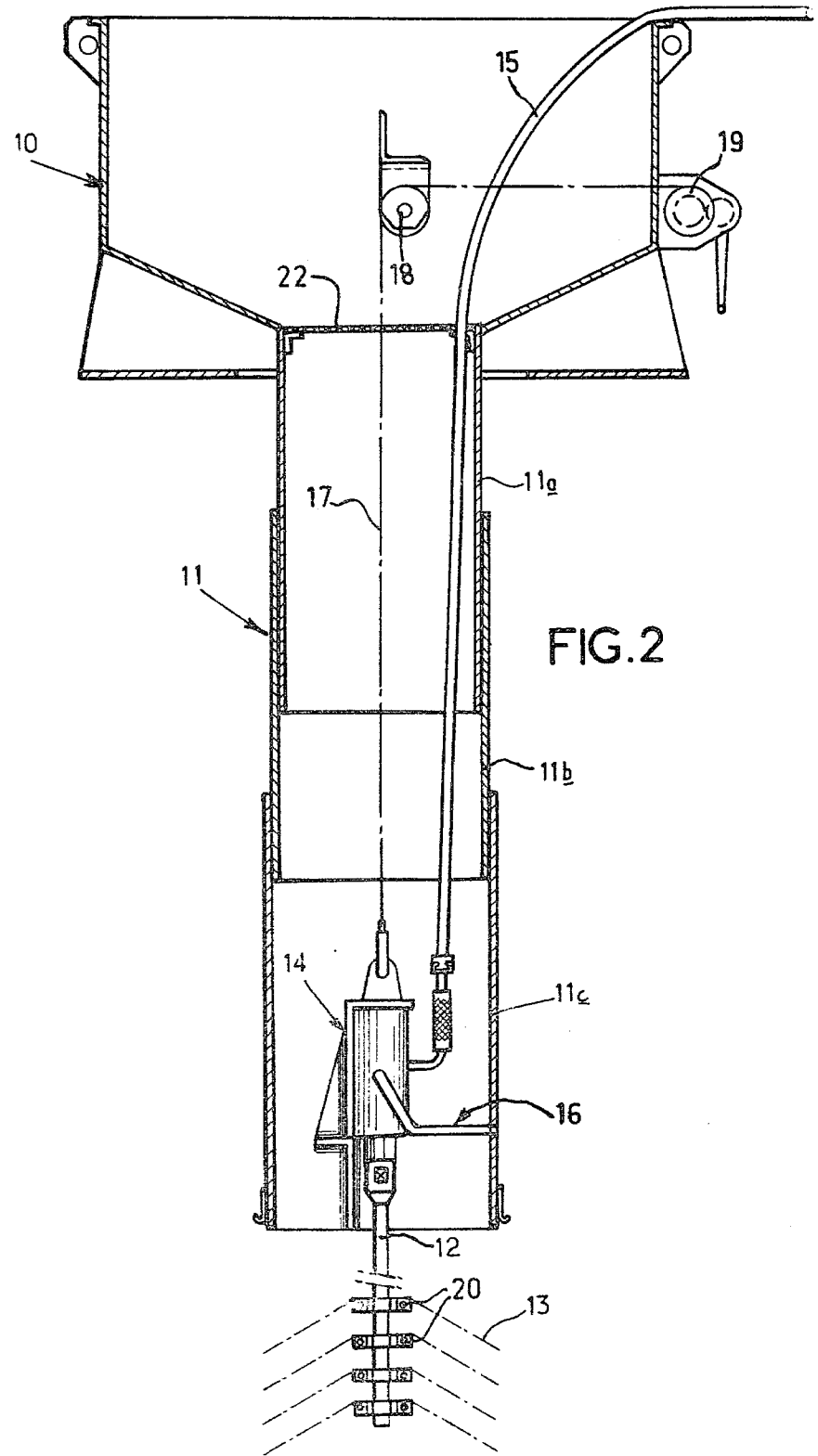

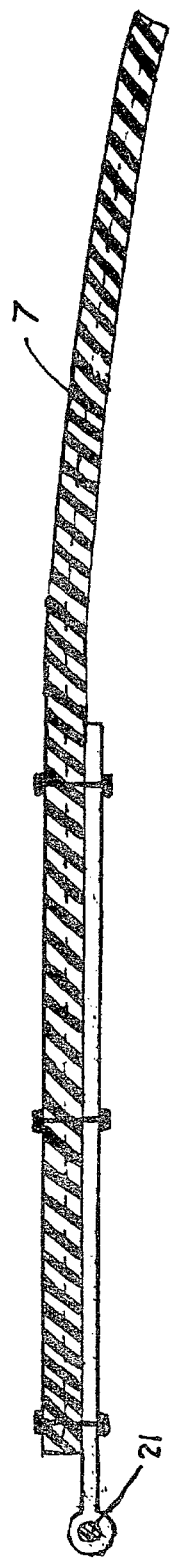
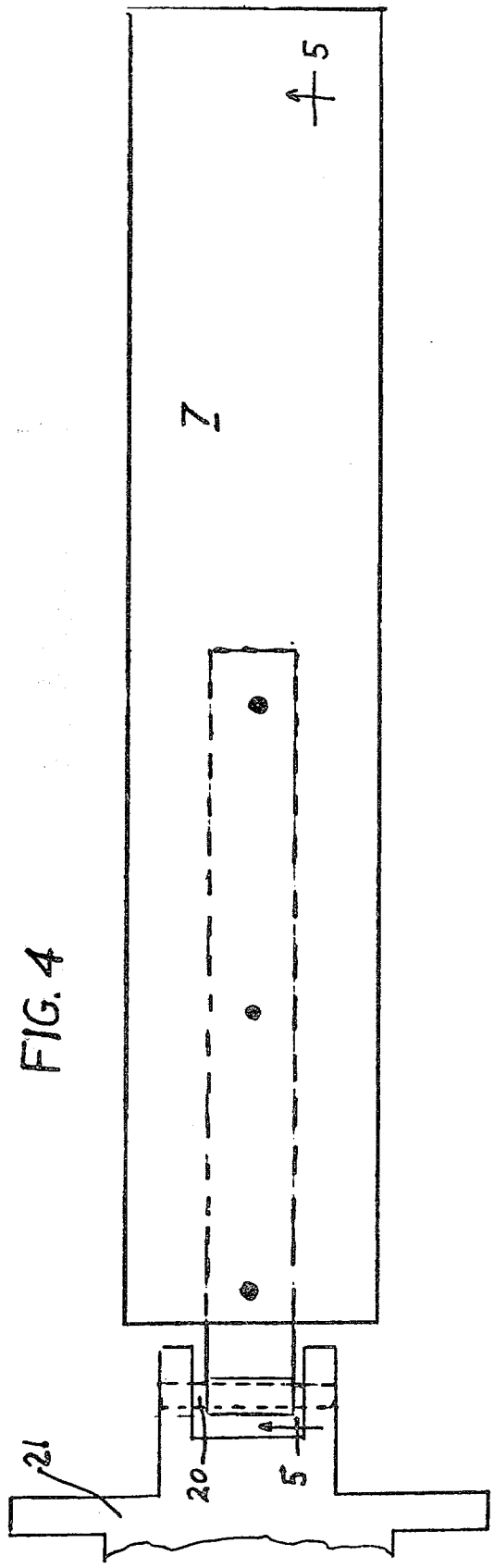
FIG. 5
FIG. 4

APPARATUS AND METHOD FOR DISTRIBUTION OF A DIVIDED SOLID IN AN ENCLOSURE

The present invention relates to an apparatus for distribution of a divided solid in an enclosure. More particularly, it relates to the storage of grains in silos and to the refilling of chemical reactors with catalysts.

By divided solid is meant a solid in the form of spherules, granules, rods, pellets and, more generally, of particles of any shape but of fairly small size. The catalysts used in the conversion reactions of chemical products or hydrocarbons, such as the reforming, cracking or desulfurization of hydrocarbons or petroleum fractions, and in hydrotreatments generally, are in the form of spherules, extrudates or multilobed shapes of small size.

In the filling of both storage silos and catalytic reactors, it is good practice to make full use of the space intended to hold the divided solid. In the case of catalysts in particular, it is advantageous to accommodate the most catalyst in the least space, and to do so in as uniform and as regular a manner as possible.

The conventional operations of charging a reactor with a granular catalyst are performed by means of a feed hopper which is installed in a manhole at the top of the reactor and into which catalyst is poured from a drum. It follows that at the point where the catalyst drops into the reactor there will be a heap of granules, and that the top surface of the catalyst bed will not be even and uniform. Generally it will have the shape of a dome that is pointed to a greater or less degree, depending on the charging rate, the nature and geometry of the granules, and the height of the drop of the granules into the reactor. Such a method is not conducive to a high charging density. (The charging density is equal to the ratio of the weight of the divided solid charged to the available volume in the enclosure.)

A number of methods have been developed for increasing the charging density both in silos and in reactors. In some of these methods there is, in addition to the feed hopper and in proximity to the lower opening thereof, a massive revolving member which is driven either by a motor or by the weight of the solid particles falling on a blade that is integral with the revolving member.

Such techniques are described in French Pat. No. 2,189,298 and in U.S. Pat. Nos. 3,361,258, 3,430,788, 3,064,833, 2,687,892, 1,729,341 and 1,590,866, for example.

Another method, described in French Pat. No. 2,288,560, consists in installing in proximity to the lower opening of the hopper a static member which receives the catalyst granules coming from the hopper. Air injected radially at the level of that static member then distributes the catalyst granules in the reactor.

While these methods appear to give satisfactory results, they are afflicted with the following drawbacks:

On the one hand, depending on the size of the manhole provided in the top of the silo, and particularly of a catalytic reactor, it may not be possible to introduce the massive revolving or static member into the enclosure because of its size, and on the other hand it is important in the case of catalytic reactors to prevent all mechanical wear of the catalyst as it would result in fines which would detract from the efficiency of the reaction and, moreover, would represent catalyst weight losses. Now distribution by means of a massive revolving or fixed member, usually made of steel, inevitably results in that type of wear (attrition).

The present invention seeks to overcome these drawbacks.

It is therefore an object of the present invention to provide an apparatus for the distribution of a divided solid which can readily be introduced into an enclosure such as a silo or a catalytic reactor even when the opening which is available for introduction of the distribution system is of small diameter.

Another object of the present invention is an apparatus for distribution of a divided solid such as a catalyst which results in but slight attrition of the catalyst.

Still another object of the invention is to provide an apparatus for distribution of a divided solid which results in increased charging density in a storage enclosure for such solid.

To this end, the invention has as a preferred embodiment, apparatus for the distribution of a divided solid in an enclosure which comprises a feed hopper for the divided solid, a discharge conduit integral with said hopper, a revolving member located downstream of the outlet opening of said conduit, and a motor for driving said revolving member in rotation, said apparatus being characterized in that the revolving member comprises a shaft driven by the motor and extending substantially parallel to the axis of the discharge conduit, and at least one fairly soft deflecting means which is carried on said shaft and is articulated thereto in such a way as to diverge angularly by the effect of centrifugal force when driven in rotation.

The deflecting means may be of any appropriate form (sectors of a circle, straps, etc.) and may be made of a rigid, semirigid or flexible material. One or more deflecting means articulated to the shaft at several points on a given shaft section and/or at longitudinally offset levels may be used. The deflecting means which are articulated to the shaft may all be of the same size or may be of different sizes.

In the case of straps, in particular, the straps attached at the highest point on the shaft may be shorter than the others, with the length of the straps increasing progressively from the top toward the bottom of the shaft. For industrial use, the straps may range from a few centimeters to several meters in length, and generally will range from 10 cm to 2 or 3 m.

The studies and tests conducted by the Applicants have prompted them to use as preferred deflecting means flexible straps made of a semirigid material such as reinforced rubber. These straps may have any desired cross section. They may be flat, cylindrical, helicoidal, etc. They may be suspended from the drive shaft by means of hooks, or they may be hinged to it by means of pins preventing any lateral movement in proximity to the point of anchorage.

The particles coming from the discharge conduit are deflected by the straps so driven in rotation in the path of these particles without the latter sustaining pronounced attrition since the straps are fairly soft. Attrition is further minimized by the fact that the straps require but a moderate rotative speed for good distribution of the catalyst in the reactor since the length of the straps may exceed the diameter of the prior-art revolving or static members without this preventing the system from being introduced into the reactor through the manhole.

The motor driving the shaft in rotation is preferably an air motor that is located in the hopper and/or in the discharge conduit. In order that the shaft driving the deflecting means need not be unduly long, the motor is preferably located in the discharge conduit directly upstream of the outlet opening of that conduit. The motor is made integral with the conduit.

To be readily able to allow for the geometry of the reactor or silo, and in particular for the portions usually referred to as internals, and to facilitate also the transportation of the apparatus and its placement in the reactor, the conduit is advantageously made up of telescoping sections which permit its length to be adjusted to the length of the reactor inlet pipe.

The drive motor in the conduit then is preferably fixed to the lowermost telescoping section of the discharge conduit. Moreover, the motor is fastened to a cable passing over a pulley. The length of the conduit may then be adjusted by raising the motor, which, being integral with the last telescoping section, will carry the latter along.

For regulation of the feed rate of the divided solid, at least one grating is disposed in the path of the particles perpendicularly to the axes of the conduit and of the hopper. While this grating may be placed at the lower end of the conduit, for example, it is preferably located at the other end, that is to say, at the bottom of the hopper, and at least a portion of the grating is articulated about a horizontal axis so that it may be pivoted out of the way in the event that the hopper should accidentally become clogged. Moreover, an adjustable diaphragm may be placed over the opening of the hopper to close it off to a greater or less extent for adjustment of the feed rate of the solid.

Another advantage of the apparatus in accordance with the present invention is that the deflecting means which are driven in rotation act as a blower, which makes it possible, moreover, to discharge the fines from the reactor in which the hopper is installed.

As will become apparent further on from the examples, the apparatus in accordance with the invention makes it possible to fill the enclosure more completely. This is an advantage not only when the enclosure is a silo or other storage space but also in the case of a catalytic reactor because although the pressure drop in the reactor will then be greater since the charging density is higher, the reactor operating conditions, such as temperature, pressure, gas/charge ratio, feed rate of charge to be treated, etc., can then be varied advantageously since the reactor contains more catalyst. It should also be noted that the reactions to be carried out over the catalyst may be pushed farther. In the case of hydrodesulfurization, for example, a higher degree of desulfurization may be obtained under the same operating conditions.

Two embodiments of the invention shown diagrammatically in the accompanying drawings will now be described. The advantages of this distribution system will then be illustrated by means of examples.

FIG. 1 is an axial section through a first embodiment of an apparatus in accordance with the invention;

FIG. 2 is an analogous view of a second embodiment;

FIG. 3 is a detail view illustrating a preferred mode of fastening the straps forming the deflecting means FIG. 4 is similar to FIG. 3 but additionally showing a reinforced rubber strap mounted by a pin to the drive shaft bearing bracket; and FIG. 5 is a vertical section taken along line 5—5 in FIG. 4.

Figure 1A:
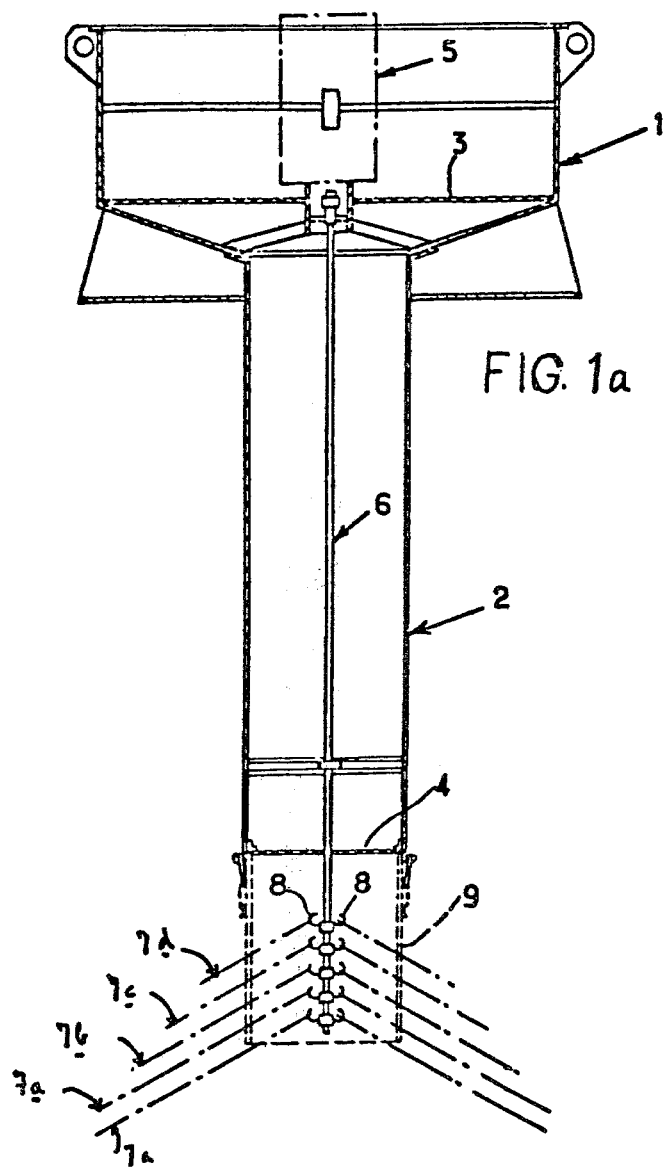
FIG. 1a is similar to FIG. 1 but showing a modified embodiment wherein the straps are of different lengths.

The distribution apparatus of FIG. 1 comprises a feed hopper 1 for divided products which is intended to fit into the manhole of the enclosure (such as a silo, a chemical reactor or the like) to be filled. The hopper is provided at its bottom with a discharge conduit 2. A retaining grating 3 is placed across the hopper, and a feed-rate regulating grating 4 is disposed at the bottom of conduit 2.

In accordance with the invention, a compressed-air motor 5 located in the hopper drives, through a shaft 6 extending parallel to the axis of the conduit 2, deflecting means 7 formed by straps of a semirigid material which are suspended from the shaft 6 by means of hooks 8 disposed regularly or irregularly about the periphery of the shaft 6 at different levels along the length of the shaft. The straps may all be of the same length or may be of different lengths. Specifically, the upper straps may be shorter than the straps disposed in proximity to the end of the rotating shaft.

As has been explained above, and as is shown in the drawing, when the shaft 6 is driven in rotation by the motor 5, the straps 7 are lifted by centrifugal force and form an angle with the axis of the conduit 2 that varies with the rotative speed of the shaft 6. The solids particles discharged through the conduit 2 then impinge on the straps 7, which deflect them from their vertical path to distribute them more evenly in the enclosure to be filled.

The straps are made of a fairly soft material so as not to shatter the particles with which they come in contact. An appropriate material is rubber. However, the straps should not be too pliable as otherwise they might wrap around the shaft 6. The preferred material is reinforced rubber.

The simplicity of this apparatus and the case with which it can be maintained and with which the straps 7 can be replaced are remarkable. In order to eliminate the risk of damage to the end of the shaft 6 carrying the hooks 8 while the apparatus is being moved about, a detachable section 9 forming a protective shield for the base of the shaft 6 may be provided at the bottom of the conduit. This section 9 is of course removed as the apparatus is being put in place on the enclosure to be equipped with it.

Notwithstanding its advantages over the prior-art arrangement, the apparatus shown in FIG. 1 has a drawback in that it does not make allowance for any "internals" which may be present or for the length of the reactor inlet pipe. Moreover, because of its great length the shaft 6 may be subject to considerable torsional stresses.

The applicant therefore have developed the preferred embodiment of the invention shown in FIG. 2.

This variant comprises a hopper 10 which feeds a conduit 11 which, however, is formed of a plurality of telescoping sections 11a, 11b and 11c permitting its length to be adjusted to any "internals" which may be present and also to the length of the reactor inlet pipe, in other words, to both the geometry of the enclosure itself and to any "internals".

To permit the shaft 12 carrying the straps 13 to be kept short, the air motor 14 which drives said shaft is located at the bottom of the conduit in close proximity to the discharge opening. The motor is supplied with compressed air through a flexible tube 15 which descends into the hopper 10 and conduit 11, an outlet tube 16 passing through the base section 11c of the conduit sideways.

The motor 14 is made integral with the lowermost telescoping section of the conduit 11. It is suspended from a cable 17 which passes around the pulleys 18 and 19. Thus the motor may readily be raised or lowered, depending on the length of the reactor inlet pipe and on any "internals" which may be present. The motor carries the last telescoping section with it and thus permits the length of the conduit 11 to be adjusted.

It will be noted that in the case of FIG. 2 the straps are not suspended by means of hooks, as in the preceding embodiment; rather, one of their ends is pivoted on a pin 20 whose ends are held in a bearing bracket 21 (FIG. 3) which is integral with the shaft 12. This mode of fastening the straps offers the advantage that all side play of the straps is eliminated.

A feed-rate regulating grating 22 is disposed at the bottom of the hopper 10. At least one sector of this grating may be mounted so as to be pivotable on a horizontal axis in order that it may be moved out of the way in the event of accidental clogging of the hopper.

Enclosure-filling tests have been conducted with the apparatus in accordance with the invention as applied to the filling of a catalytic reactor with different types of catalyst. These tests are described in the examples which follow, and the results are compared with those obtained with other filling methods known in the art.

As pointed out above, the deflecting means can aid in the removal of catalyst fines through an opening in the reactor, which may be either the manhole in which the hopper is installed, in the case of an axial reactor, or an opening located at the base, in the case of a radial reactor. The fines so removed may be recovered through an intake duct connected to said opening.

EXAMPLE 1

The tests were performed in the laboratory, using as reactor model a drum 60 cm in diameter and 90 cm high with a capacity of 200 liters, which was filled to a level of 40 cm from the bottom.

The distribution apparatus used was of the type shown in FIG. 1 and had pliable rubber-reinforced straps 4 cm wide and 20 cm long, which were articulated to the drive shaft by means of hooks at three different levels spaced 7 cm apart. Four straps, offset from one another by 90°, were attached at the lowermost level, and six straps, offset 60°, were attached at each of the other two levels. A distribution grating whose characteristics varied with the tests was disposed at the bottom of the hopper.

The filling tests were run with four types of catalysts, $C_1$, $C_2$, and $C_3$ and $C_4$, whose characteristics were as follows:

|   | Shape | Diameter mm | Length mm |
|---|---|---|---|
| $C_1$ | Extrudates | 1.54 | 3.0 |
| $C_2$ | Extrudates | 2.32 | 5.4 |
| $C_3$ | Spherules | 1.50 | — |
| $C_4$ | Pellets | 3.0 | 3.0 |

The test conditions are summarized in Table 1 which follows.

TABLE 1

| Catalyst | Distribution grating Diameter mm | Openings | Feed rate kg/h | Rotative speed of straps rpm |
|---|---|---|---|---|
| $C_1$ | 115 | 18, each 18 mm in diameter | 940 | 120 |
| $C_2$ | 115 | 6, each 26 mm in diameter | 783 | 120 |
| $C_3$ | 115 | 16, each 15 mm in diameter | 727 | 100 |
| $C_4$ | 115 | 12, each 18 mm in diameter | 1068 | 120 |

Comparison tests were then run with a laboratory reactor using conventional filling methods, namely:

(a) Sock filling (using a flexible tube inserted in the reactor which is withdrawn as the level rises).

(b) Compacting by vibration. This filling method regularly gives the highest densities.

(c) Sprinkling.

The filling densities measured in the above tests are given in Table 2 which follows.

TABLE 2

| | Filling method | | | |
|---|---|---|---|---|
| Catalyst | Sock | Compacting | Sprinkling | Apparatus in accordance with the invention |
| $C_1$ | 0.74 | 0.85 | 0.85 | 0.86 |
| $C_2$ | 0.55 | 0.64 | 0.63 | 0.64 |
| $C_3$ | 0.57 | 0.63 | 0.62 | 0.63 |
| $C_4$ | 0.87 | 0.99 | 0.98 | 0.98 |

It is apparent from this table that the use of the distribution apparatus in accordance with the invention results in higher filling densities than those achieved by the sock method, and in densities which come close to those obtained by the sprinkling method and are equal to those secured by compacting, which in the art is regarded as the most efficient method but is limited to small-size enclosures.

EXAMPLE 2

This example relates to a test run on a catalytic desulfurization unit provided with an apparatus in accordance with the invention having a grating for regulation of the catalyst feed rate.

Catalyst charged: 35.28 tons of extrudates 1.5 mm in diameter, followed by 2.14 tons of extrudates 3 mm in diameter The revolving device had seven levels of four straps each, the uppermost straps (first level) being trapezoidal.

The packing density obtained was 0.82, whereas that obtained by the conventional sock method was 0.71. The increase obtained thus was 16%.

EXAMPLE 3

This example relates to the charging of an industrial hydrodesulphurization reactor. The apparatus used conformed to FIG. 3 of the drawing. It further comprised a diaphragm at the bottom of the hopper in place of the grating for regulation of the catalyst feed rate.

A total of 19.3 tons of catalyst (spherules 1.5 mm in diameter) was charged to the reactor.

The density obtained was 0.68, which compares favorably with that secured by the conventional sock method, namely, 0.62

The increase in density thus was about 10.5%.

EXAMPLE 4

The applicants performed an industrial-scale charging operation on a radial reactor with the same apparatus as that used in Example 3.

The results, compared to those obtained by the sock method, are presented in Table 3 below.

TABLE 3

|  | Charging by sock | Charging in accordance with the invention |
|---|---|---|
| Weight of catalyst charged, tons | 8.1 | 9.3 |
| Volume charged, m³ | 13.06 | 12.55 |
| Density | 0.62 | 0.74 |
| Increase |  | 19% |

These results show that the apparatus in accordance with the invention makes it possible to increase the packing densities very considerably.

We claim:

1. An apparatus for distribution of divided particulate matter of the type including petrochemical catalysts and grain in an enclosure such as a chemical reactors, grain elevators or silos, comprising a feed hopper for the particles, a vertically disposed elongated discharge conduit of substantially uniform cross-section depending from said hopper, a motor means, a shaft driven by said motor means and extending substantially along the vertical axis of the discharge conduit, and a plurality of relatively soft deflecting means in the form of straps joined to said shaft and being disposed downstream of the outlet opening of said conduit and being articulated on said shaft in a manner adapted to diverge angularly from a downward position towards an outward position sweeping across said outlet opening by the effect of centrifugal force when said shaft is rotated by said motor means, said straps being of a length in the range of about 10 cm to several meters so as to be sufficient to give within said enclosure good distribution to particles impinged thereby at moderate speeds of rotation of said shaft, and at least one grating means for regulating the feed rate and distribution of the particles from said feed hopper through said discharge conduit to said deflecting means.

2. An apparatus according to claim 1, wherein said straps are made of a semirigid material.

3. An apparatus according to claim 1, wherein the straps are made of reinforced rubber.

4. An apparatus according to claim 1, wherein the deflecting means are all of the same size.

5. An apparatus according to claim 1, wherein the deflecting means include straps of different sizes.

6. An apparatus according to claim 1, wherein the deflecting means are suspended from the shaft by means of hooks.

7. An apparatus according to claim 1, wherein the deflecting means are articulated to the shaft by means of pins whose ends are held in a bearing bracket.

8. An apparatus according to claim 1, wherein the motor means is located in the hopper.

9. An apparatus according to claim 1, wherein the motor means is located in the lower portion of said conduit.

10. An apparatus according to claim 8, wherein the motor means is an air motor.

11. An apparatus according to claim 9, wherein the motor means is an air motor.

12. An apparatus according to claim 9, wherein the location of the motor means relative to the hopper is variable.

13. An apparatus according to claim 11, wherein the motor is fastened to a cable inside the conduit.

14. An apparatus according to claim 12, wherein the conduit is formed of telescoping sections.

15. An apparatus according to claim 13, wherein the conduit is formed of telescoping sections.

16. An apparatus according to claim 1, wherein a grating for regulation of the feed rate is disposed at the lower end of the conduit.

17. An apparatus according to claim 15, wherein a grating for regulation of the feed rate is disposed at the lower end of the conduit.

18. An apparatus according to claim 1, 9, or 11, wherein a grating for regulation of the feed rate is disposed at the bottom of the hopper.

19. Method of densely charging a chemical reactor with catalyst particles through a relatively small opening, comprising feeding said catalyst particles to a holding zone, flowing said particles essentially vertically downwardly by means of gravity from said holding zone through an elongated confined columnar zone, said flowing being at a regulated rate, said flowing further being such as to fall with substantially even distribution across said columnar zone, the lower end of said columnar zone defining an outlet within the upper central portion of said reactor and said columnar zone extending through said reactor opening, rotating a plurality of relatively soft deflecting means below said outlet and about the vertical axis of symmetry of said columnar zone and at a speed in a range sufficient to give good distribution of catalyst particles without causing undue attrition to such relatively fragile particles, said means being in the form of straps articulated to pass through said reactor opening when at rest and to diverge angularly from a downward hanging position towards an outward position sweeping across said outlet by the effect of centrifugal force when said shaft is rotated, said straps being of a length in the range of about 10 cm to several meters so as to be sufficient to give good distribution within said reactor of the particles impinged thereby at moderate speeds of rotation of said straps.

* * * * *